(12) United States Patent
Miyashita et al.

(10) Patent No.: US 8,013,485 B2
(45) Date of Patent: Sep. 6, 2011

(54) MOTOR WITH AN ELECTROMAGNETIC BRAKE

(75) Inventors: Toshihito Miyashita, Nagano (JP);
Masahiro Yamaguchi, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 359 days.

(21) Appl. No.: 12/413,937

(22) Filed: Mar. 30, 2009

(65) Prior Publication Data

US 2009/0284105 A1    Nov. 19, 2009

(30) Foreign Application Priority Data

Mar. 31, 2008  (JP) ................................. 2008-092715

(51) Int. Cl.
*H02K 11/00*    (2006.01)

(52) U.S. Cl. ........................................................ 310/77
(58) Field of Classification Search ................... 310/76, 310/77, 92, 93, 68 B, 90; 188/161, 162, 188/171
See application file for complete search history.

(56) References Cited

U.S. PATENT DOCUMENTS

| 2,536,491 | A * | 1/1951 | Chapman et al. | 310/77 |
| 6,459,182 | B1 * | 10/2002 | Pfann et al. | 310/77 |
| 7,598,642 | B2 * | 10/2009 | Scherzinger et al. | 310/90 |
| 2004/0239196 | A1 * | 12/2004 | Miura et al. | 310/77 |

FOREIGN PATENT DOCUMENTS

| JP | 56-012830 | 2/1981 |
| JP | U01-171563 A | 12/1989 |
| JP | 2004-222391 | 8/2004 |
| JP | 2005-124259 | 5/2005 |

* cited by examiner

*Primary Examiner* — Dang D Le
(74) *Attorney, Agent, or Firm* — Rankin, Hill & Clark LLP (57) ABSTRACT

A motor with an electromagnetic brake is provided that is capable of sufficiently reducing influence of leakage magnetic flux on a magnetic sensor. A second ball bearing is configured to be ferromagnetic. An inner circumferential surface of a bearing stopper member that faces the shaft is disposed in proximity to the outer circumferential surface of the shaft. The bearing stopper member, which is ferromagnetic, is fixed to the second bearing holder in order to prevent the second ball bearing from getting out of a bearing fitting portion. A magnetic shield member is fixed to a portion of the shaft between the bearing stopper member and a magnetic sensor. The magnetic shield member guides leakage magnetic flux, which has been generated by an electromagnetic coil and leaked through the shaft, from the shaft to the bearing stopper member, thereby reducing influence of the leakage magnetic flux on the magnetic sensor.

18 Claims, 7 Drawing Sheets

MOTOR WITH AN ELECTROMAGNETIC BRAKE

BACKGROUND OF THE INVENTION

The present invention relates to a motor with an electromagnetic brake that prevents a shaft from rotating together with a load when the motor is not driven.

Japanese Patent Publication No. 2005-124259 (JP2005-124259A), for example, discloses a motor including a motor stator and a motor rotor that includes a shaft formed of a ferromagnetic material and rotates relative to the motor stator. Then, the motor is provided with an electromagnetic brake in order to prevent the shaft from rotating together with a load at a time of emergency stop. The electromagnetic brake includes a brake friction plate fixed to the shaft, a brake plate, and an electromagnetic coil disposed on a brake core. When braking is applied, the electromagnetic brake brings the brake plate into contact with the brake friction plate, thereby preventing the shaft from rotating. When braking is not applied, the electromagnetic brake keeps the brake plate and the brake friction plate apart from each other by means of an electromagnetic force generated by the electromagnetic coil, thereby allowing the shaft to rotate. In the motor of this type, however, a magnetic sensor is usually disposed outside an end of a non-load-side end portion of the shaft. Thus, leakage magnetic flux that has been generated by the electromagnetic coil and leaked through the shaft may pass through the magnetic sensor. Malfunction of the magnetic sensor may thereby occur. Then, JP2005-124259A proposes the following. An internal fan that discharges heat inside the motor to outside is provided at a portion of the shaft closer to the non-load-side end portion than the electromagnetic brake. Then, a heat shielding plate is provided at a bracket. The brake core, with the electromagnetic coil disposed thereon, is fixed to the bracket. Then, each of the internal fan and heat shielding plate is formed of a ferromagnetic material. With this arrangement, a portion of the leakage magnetic flux that has been generated by the electromagnetic coil and leaked through the shaft is guided back to the electromagnetic coil through the internal fan and the heat shielding plate. Reduction of influence of the leakage magnetic flux on the magnetic sensor is thereby planned.

However, in the motor with an electromagnetic brake disclosed in JP2005-124259A, the bracket at which the heat shielding plate is provided is formed of aluminum, which is a nonmagnetic material. Further, the leakage magnetic flux cannot be flown from the internal fan to the heat shielding plate. Accordingly, the influence of the leakage magnetic flux on the magnetic sensor cannot effectively be reduced.

The overall shaft or the non-load-side end portion of the shaft may be formed of a nonmagnetic material such as stainless steel. In this configuration, however, it becomes difficult to process the shaft, and material cost for the shaft is also increased.

SUMMARY OF THE INVENTION

An object of the present invention is to provide a motor with an electromagnetic brake capable of sufficiently reducing influence of leakage magnetic flux on a magnetic sensor.

A motor with an electromagnetic brake, the improvement of which is aimed at in the present invention, includes a motor stator, a motor rotor, a first bearing, a first bearing holder, a second bearing a second bearing holder, a bearing stopper member, an electromagnetic brake, and a magnetic sensor. The motor rotor includes a shaft and a rotor portion fixed to the shaft. The shaft is formed of a ferromagnetic material and has a load-side end portion and a non-load-side end portion. The first bearing rotatably supports the shaft at a position in the vicinity of the load-side end portion. The first bearing holder is fixed to the motor stator and holds the first bearing. The second bearing rotatably supports the shaft at a position in the vicinity of the non-load-side end portion. The second bearing holder is ferromagnetic, and includes a bearing fitting portion into which the second bearing is fitted. The bearing stopper member is ferromagnetic and is fixed to the second bearing holder to prevent the second bearing fitted into the second bearing holder from getting out of the bearing fitting portion. The electromagnetic brake includes a brake friction plate fixed to a portion of the shaft that is located between the rotor portion and the second bearing; a brake plate; and an electromagnetic coil disposed on a brake core. The electromagnetic brake brings the brake plate into contact with the brake friction plate, thereby preventing the shaft from rotating when braking is applied, and keeps the brake plate and the brake friction plate apart from each other by means of an electromagnetic force generated by the electromagnetic coil, thereby allowing the shaft to rotate when braking is not applied. The magnetic sensor is disposed outside an end of the non-load-side end portion of the shaft projecting from the second bearing. In the present invention, the bearing stopper member is of an annular structure having a through-hole through which the shaft passes, and has an inner circumferential surface that faces an outer circumferential surface of the shaft and is located in proximity to the outer circumferential surface of the shaft. Then, a magnetic shield member is fixed to the non-Load-side end portion of the shaft, and located between the bearing stopper member and the magnetic sensor to guide leakage magnetic flux, which has been generated by the electromagnetic coil and leaked through the shaft, from the shaft to the bearing stopper member, thereby reducing influence of the leakage magnetic flux on the magnetic sensor.

As with the present invention, if the second bearing holder is ferromagnetic, the magnetic shield member formed of a ferromagnetic material is arranged between the bearing stopper member and the magnetic sensor, and the inner circumferential surface of the bearing stopper member formed of a ferromagnetic material is disposed in proximity to the outer circumferential surface of the shaft, the leakage magnetic flux that has been generated by the electromagnetic coil and flows through the shaft is actively guided from the shaft to the bearing stopper member. Much of the leakage magnetic flux flows in the order of the brake core, shaft, magnetic shield member, bearing stopper member, and brake core. For this reason, the density of the leakage magnetic flux that passes through the magnetic sensor may be reduced with a simpler structure than a typical configuration in which each of an internal fan and a heat shielding plate is formed of a ferromagnetic material. Influence of the leakage magnetic flux on the magnetic sensor may be thereby reduced.

Either one may be adopted from a configuration in which the magnetic shield member is arranged between the bearing stopper member and the magnetic sensor and a configuration in which the inner circumferential surface of the bearing stopper member is disposed in proximity to the shaft. Even when only the configuration in which the magnetic shield member is arranged is adopted, much of the magnetic flux flows in the order of the brake core, shaft, magnetic shield member, bearing stopper member, and brake core. When only the configuration in which the inner circumferential surface of the bearing stopper member is disposed in proximity to the shaft is adopted, much of the magnetic flux flows through in the order of the brake core, shaft, bearing stopper member, and brake core. When one of these configurations is adopted as described above, the density of the leakage magnetic flux that passes through the magnetic sensor is higher than when both of the above-mentioned configurations are adopted. However, a magnetic shield may be constituted by a comparatively simple structure.

The second bearing holder may be the brake core or a bracket to which the brake core is fixed. When the second bearing holder is constituted by the brake core, the number of parts of the motor may be reduced. In this configuration, much of the leakage magnetic flux flows in the order of the second bearing holder (brake core), shaft, magnetic shield member, bearing stopper member, and second bearing holder (brake core). In such a configuration, however, the brake core needs to be configured to have a concave portion for mounting the second bearing. Performance of the brake core may be thereby reduced, or the working may be complex. When the second bearing holder is constituted by the bracket to which the brake core is fixed, the above-mentioned problems may be solved. Further, the size of a motor axis in a radial direction of the shaft may be reduced. In this configuration, much of the leakage magnetic flux flows in the order of the brake core, shaft, magnetic shield member, bearing stopper member, second bearing holder (bracket), and brake core.

The first and second bearings may each comprise a ball bearing. In this configuration, the bearing stopper member may be so disposed that the bearing stopper member is in contact with an outer ring of the second bearing but is not in contact with an inner ring of the second bearing. With this arrangement, with the bearing stopper member firmly holding the second bearing, the density of the leakage magnetic flux may be reduced without disturbing operation of the second bearing.

If a second bearing holder comprises a nonmagnetic bracket to which a brake core is fixed, the magnetic shield structure of the present invention may be adopted. In this configuration, a second bearing including an outer ring which is ferromagnetic is used, and the outer ring of the second bearing is brought into contact with the brake core. If such a configuration is adopted and if a magnetic shield member is arranged between a bearing stopper member and a magnetic sensor and the inner circumferential surface of the bearing stopper member formed of a ferromagnetic material is disposed in proximity to the outer circumferential surface of a shaft, much of leakage magnetic flux flows in the order of the brake core, shaft, magnetic shield member, bearing stopper member, outer ring of the second bearing, and brake core. If only the configuration in which the inner circumferential surface of the bearing stopper member is disposed in proximity to the shaft is adopted, much of the magnetic flux flows in the order of the brake core, shaft, bearing stopper member, outer ring of the second bearing, and brake core.

The magnetic shield member may comprise: a plate-like portion that extends in the radial direction of the shaft and faces the bearing stopper member with a space interposed therebetween in an axial direction of the shaft; and a projecting portion that projects from the plate-like portion toward the magnetic sensor. With this arrangement, the bearing stopper member and the magnetic shield member are arranged in the axial direction of the shaft. Flow of magnetic flux from the magnetic shield member to the bearing stopper member is thereby promoted. The magnetic flux tends to flow through a path with high permeability. Thus, the magnetic flux tends to flow through a convex end. For this reason, when a projecting portion is provided at the magnetic shield member, the leakage magnetic flux flows out to a space from an end of the projecting portion. The density of the leakage magnetic flux that passes through the magnetic sensor may be thereby reduced.

More specifically, the projecting portion may be integrally formed with the plate-like portion of a disc shape and may be formed to be of a cylindrical shape that projects toward the magnetic sensor from an outer circumferential portion of the plate-like portion. With this arrangement, the end of the projecting portion depicts a circle around the shaft, thereby effectively reducing the density of the leakage magnetic flux that passes through the magnetic sensor.

The magnetic sensor may be a magnetic rotary encoder that comprises: a rotation body fixed to the end of the shaft; a plurality of permanent magnets disposed at the rotation body; and a magnetic detector that detects magnetic fluxes of the permanent magnets. In this configuration, an end of the cylindrical projecting portion of the magnetic shield member may be opposed to the rotation body with a space interposed therebetween. With this arrangement, the permanent magnets disposed at the rotation body of the magnetic sensor and the magnetic detector are located in a region surrounded by the cylindrical projecting portion of the shield member outside the end of the shaft. The density of the leakage magnetic flux in the vicinity of the permanent magnets and the magnetic detector may be reduced.

In a more specific configuration, a motor with an electromagnetic brake of the present invention comprises: a motor portion; an electromagnetic brake; and a rotation position detector that detects a rotation position of the motor. The motor portion, electromagnetic brake, and rotation position detector are arranged along a shaft of the motor. The motor portion comprises: a motor stator arranged within a housing; a motor rotor including a shaft and a rotor portion fixed to the shaft, the shaft being formed of a ferromagnetic material and having a load-side end portion and a non-load-side end portion; a first bearing that rotatably supports the shaft at a position in the vicinity of the load-side end portion; a first bearing holder that is fixed to the motor stator through the housing and holds the first bearing; a second bearing that rotatably supports the shaft at a position in the vicinity of the non-load-side end portion; a second bearing holder which is ferromagnetic and includes a bearing fitting portion into which the second bearing is fitted; and a bearing stopper member that is ferromagnetic and is fixed to the second bearing holder in order to prevent the second bearing fitted into the second bearing holder from getting out of the bearing fitting portion. The electromagnetic brake includes: an electromagnetic brake housing coupled to the housing; a brake core fixed to inside the electromagnetic housing; an electromagnetic coil disposed on the brake core; a plate structure portion including a brake plate provided to be operable relative to the brake core; and a brake friction plate fixed to a portion of the shaft that is located between the rotor portion and the second bearing. Then, the electromagnetic brake brings the brake plate into contact with the brake friction plate, thereby preventing the shaft from rotating when braking is applied, and keeps the brake plate and the brake friction plate apart from each other by means of an electromagnetic force generated by the electromagnetic coil, thereby allowing the shaft to rotate when braking is not applied. The rotation position detector comprises: a detector housing coupled to the electromagnetic brake housing; and a magnetic sensor arranged inside the detector housing and arranged outside an end of the non-load-side end portion of the shaft projecting from the second bearing. The brake core also serves as the second bearing holder. The bearing stopper member is fixed to the brake core. The bearing stopper member is of an annular structure having a through-hole through which the shaft passes, and has an inner circumferential surface that faces an outer circumferential surface of the shaft and is located in proximity to the outer circumferential surface of the shaft. A magnetic shield member is fixed to the non-load-side end portion of the shaft, and located between the bearing holding member and the magnetic sensor to guide leakage magnetic flux that has been generated by the electromagnetic coil and leaked through the shaft, from the shaft to the bearing stopper member, thereby reducing influence of the leakage magnetic flux on the magnetic sensor.

If the motor with an electromagnetic brake is configured as described above, the leakage magnetic flux that has been generated by the electromagnetic coil and leaked through the shaft may be actively guided from the shaft to the bearing stopper member. The influence of the leakage magnetic flux on the magnetic sensor may be thereby reduced. Especially, the brake core also serves as the second bearing holder. Thus, the number of parts of the motor may be reduced.

According to the present invention, in either of a configuration in which whether the second bearing holder is configured to be ferromagnetic and a configuration in which the second bearing holder is formed of a nonmagnetic material, the magnetic shield member of the ferromagnetic material is arranged between the bearing stopper member and the magnetic sensor. Then, the inner circumferential surface of the bearing stopper member formed of the ferromagnetic material is disposed in proximity to the outer circumferential surface of the shaft. Thus, the leakage magnetic flux that has been generated by the electromagnetic coil and leaked through the shaft may be actively guided from the shaft to the bearing stopper member. The density of the leakage magnetic flux that passes through the magnetic sensor may be reduced with a simpler structure than a typical configuration in which each of an internal fan and a heat shielding plate is formed of a ferromagnetic material. The influence of the leakage magnetic flux on the magnetic sensor may be thereby reduced. For this reason, malfunction of the magnetic sensor caused by the leakage flux may be prevented.

DETAILED DESCRIPTION OF PREFERRED EMBODIMENTS

Figure 1:
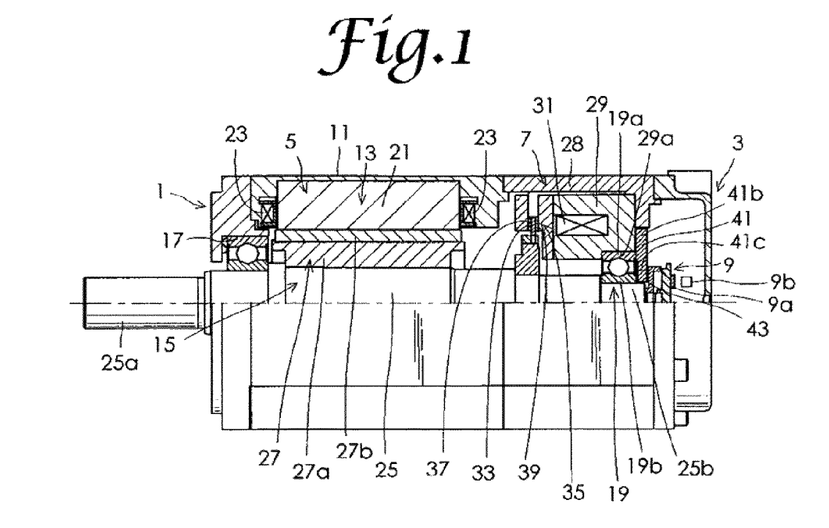
FIG. 1 shows a cutaway half-portion of a motor with an electromagnetic brake in a first embodiment of the present invention.
Figure 2:
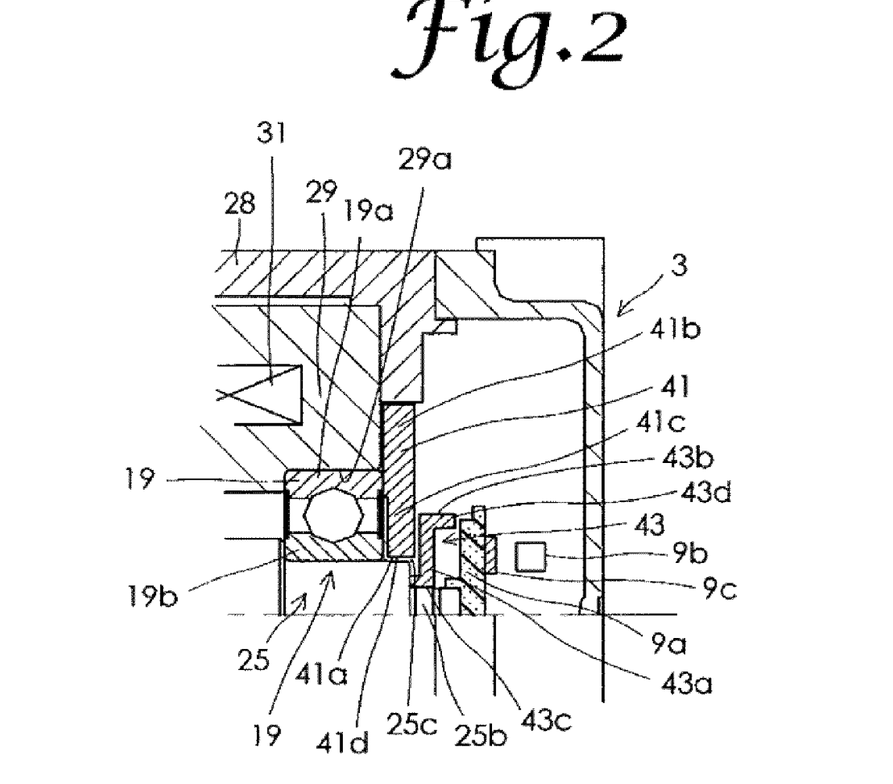
FIG. 2 is a partially magnified view of FIG. 1.

Embodiments of the present invention will be described below in detail, with reference to drawings. FIG. 1 sows a cutaway half-portion of a motor with an electromagnetic brake in a first embodiment of the present invention. FIG. 2 is a partially magnified view of FIG. 1. As shown in FIG. 1, the motor with an electromagnetic brake in this embodiment includes an end bracket 1, a sensor cover 3, a motor portion 5, an electromagnetic brake 7, and a magnetic sensor 9 that constitutes a rotation position detector. The motor portion 5 includes a cylindrical housing 11, a motor stator 13, a motor rotor 15, and a first hall bearing 17 and a second ball bearing 19 that respectively constitute first and second bearings. Though balls of the first ball bearing 17 and the second ball bearing 19 are drawn as polygons for the purpose of illustration, the balls are actually spherical. The motor stator 13 is fixed to inside the housing 11, and includes a stator core 21 and a plurality of winding portions 23 disposed on the stator core 21.

The motor rotor 15 includes a shaft 25 and a rotor portion 27 fixed to the shaft 25. The shaft 25 is made from a ferromagnetic steel material. The shaft 25 has a load-side end portion 25a to which a load is connected and a non-load-side end portion 25b that is located opposite to the load-side end portion 25a. The rotor portion 27 includes a cylindrical rotor core 27a and a plurality of permanent magnets 27b. The rotor portion 27 is formed by processing steel or by lamination of electromagnetic steel plates. The cylindrical rotor core 27a is fitted into the shaft 25. The permanent magnets 27b are arranged on the rotor core 27a and face the motor stator 13. The shaft 25 is rotatably supported by the end bracket 1 through the first ball bearing 17 at a position in the vicinity of the load-side end portion 25a, and is rotatably supported by a brake core 29 of the electromagnetic brake 7, which will be described later, through the second ball bearing 19. In this embodiment, the end bracket 1 constitutes a first bearing holder that holds the first ball bearing 17, and the brake core 29 constitutes a second bearing holder that holds the second ball bearing 19. In the motor with an electro magnetic brake in this embodiment, the motor portion 5, the electromagnetic brake 7, and the magnetic sensor 9 are arranged along the shaft 25.

The electromagnetic brake 7 includes an electromagnetic brake bracket 28, the brake core 29, an electromagnetic coil 31, a brake friction plate 33, and a plate structure portion 35. The electromagnetic brake bracket 28 is formed of aluminum, which is a nonmagnetic material, and has a cylindrical shape. Both ends of the magnetic brake bracket 28 are coupled to the housing 11 and the sensor cover 3. In this embodiment, the electromagnetic brake bracket 28 serves as an end bracket in the vicinity of the non-load-side end portion 25b of the shaft 25. As shown in FIG. 2 in detail, the brake core 29 is fixed to inside the electromagnetic brake bracket 28, and is formed by processing or sintering steel made of a ferromagnetic material. In an end portion of the brake core 29 on the side of the non-load-side end portion 25b, a bearing fitting portion 29a is formed. The bearing fitting portion 29a is formed of an annular concave portion that opens toward the shaft 25 and the non-load-side end portion 25b. An outer ring 19a of the second ball bearing 19 is fitted into the bearing fitting portion 29a. A bearing stopper member 41 is fixed to the brake core 29 to prevent the second ball bearing 19 from getting out of the bearing fitting portion 29a. The bearing stopper member 41 is of an annular structure having a through-hole 41a through which the shaft passes. An outer diameter portion 41b of the bearing stopper member 41 located radially outside of the shaft 25 is fixed to the brake core 29. The outer diameter portion 41b is in contact with the outer ring 19a of the second ball bearing 19. An inner diameter portion 41c of the bearing stopper member 41 located radially inside of the shaft 25 is spaced apart from an inner ring 19b of the second ball bearing 19 so that the inner diameter portion 41c does not contact the inner ring 19b. An inner circumferential surface 41d of the through-hole 41a that faces an outer circumferential surface 25c of the shaft 25 is located in proximity to the outer circumferential surface 25c of the shaft 25. The inner diameter portion 41c of the bearing stopper member 41 serves to reduce influence of leakage magnetic flux, which has been generated by the electromagnetic coil 31 and is then leaked through the shaft 25, on the magnetic sensor 9. The bearing stopper member 41 that performs such a function will be described later in detail.

Referring again to FIG. 1, the brake friction plate 33 is of a disc shape and is fixed to a portion of the shaft 25 located between the rotor portion 27 and the second ball bearing 19 to extend in a radial direction of the shaft 25. The plate structure portion 35 includes an outer plate 37 and an inner plate 39 that constitute a brake plate. The outer plate 37 and the inner plate 39 are arranged in an axial direction of the shaft 25. The outer plate 27 and the inner plate 39 are spaced from the brake friction plate 33, with the brake friction plate 33 sandwiched therebetween. The outer plate 37 is indirectly fixed to the brake core 29. The inner plate 39 is provided to be operable relative to the brake core 29. Then, a spring not shown that energizes the inner plate 39 to the brake friction plate 33 is attached to the inner plate 39. When braking is applied, the electromagnetic brake 7 operates to bring the inner plate 39 and the outer plate 37 into contact with the brake friction plate 33 by means of the spring, not shown, thereby preventing the shaft 25 from rotating. When braking is not applied, the electromagnetic brake operates to keep the brake friction plate 33 and the inner plate 39 apart from each other, by the magnetic action of an electromagnetic force generated by the magnetic coil 31, thereby allowing the shaft 25 to rotate.

As shown in FIG. 2 in detail, a magnetic shield member 43 is fixed to the non-load-side end portion 25b of the shaft 25. The magnetic shield member 43 is formed by processing or sintering steel made of a ferromagnetic material, and includes a plate-like portion 43a and a projecting portion 43b. The plate-like portion 43a is of an annular structure. The plate-like portion 43a is located between the bearing stopper member 41 and a rotation body 9a of the magnetic sensor 9 which will be described later, with the shaft 25 fitted into a central opening portion 43c of the plate-like portion 43a. With this arrangement, the plate-like portion 43a faces the bearing stopper member 41 in the axial direction of the shaft 25, with a space interposed therebetween. The projecting portion 43b has a cylindrical shape, and projects toward the magnetic sensor 9 from an edge portion of the plate-like portion 43a. The magnetic shield member 43 is arranged so that an end 43d of the cylindrical projecting portion 43b faces the rotation body 9a of the magnetic sensor 9 with a space interposed therebetween. The magnetic shield member 43 serves to reduce influence of the leakage magnetic flux, which has been generated by the electromagnetic coil 31 and has leaked through the shaft 25, on the magnetic sensor 9. The magnetic shield member 43 that performs such a function will be described later in detail.

The magnetic sensor 9 is a magnetic rotor encoder, and includes the rotation body 9a fixed to the end of the shaft 25 and a magnetic detector 9b fixed to the sensor cover 3. The rotation body 9a has a shape of a disc. A plurality of permanent magnets 9c are disposed on a surface of the rotation body 9a located in an outward direction of the shaft 25. The magnetic detector 9b is arranged to face the permanent magnets 9c in the outward direction of the shaft 25, and detects magnetic fluxes of the permanent magnets 9c.

In the motor with an electromagnetic brake in this embodiment, the magnetic shield member 43 formed of the ferromagnetic material is arranged between the bearing stopper member 41 and the magnetic sensor 9. Further, the inner circumferential surface 41d of the bearing stopper member 41 formed of the ferromagnetic material is disposed in proximity to the shaft 25. Thus, the leakage magnetic flux that has been generated by the electromagnetic coil 31 and then leaked through the shaft 25 is actively guided from the shaft 25 to the bearing stopper member 41. Much of the leakage magnetic flux flows in the order of the brake core (second bearing holder) 29, shaft 25, magnetic shield member 43, bearing stopper member 41, and brake core (second bearing holder) 29. For this reason, the density of the leakage magnetic flux that passes through the magnetic detector 9b of the magnetic sensor 9 may be reduced, thereby reducing the influence of the leakage magnetic flux on the magnetic sensor 9.

In this embodiment, in addition to arrangement of the magnetic shield member 43, the inner circumferential surface 41d of the bearing stopper member 41 is disposed in proximity to the shaft 25. The present invention is not limited to this configuration alone. Either configuration may be employed from a configuration in which the magnetic shield member is arranged and a configuration in which the inner circumferential surface of the bearing stopper member is disposed in proximity to the shaft.

Figure 3:
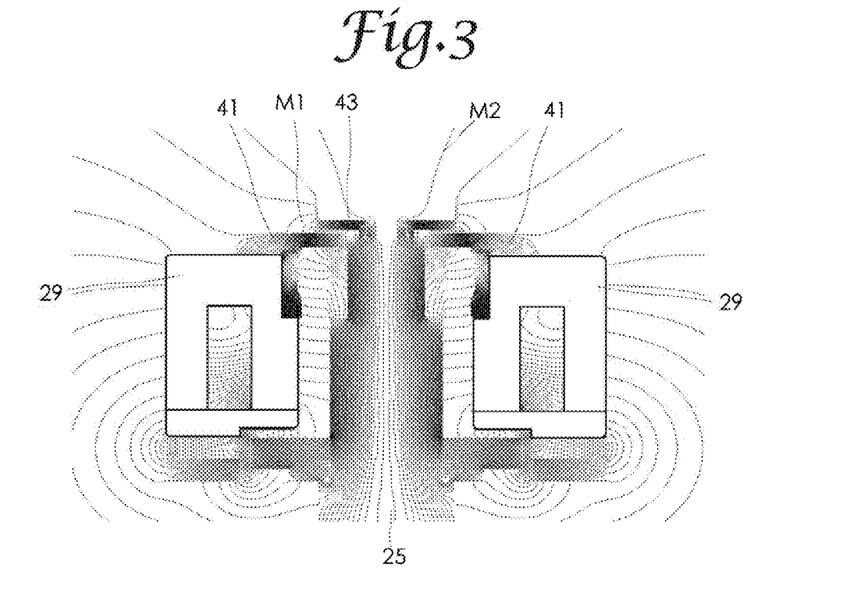
FIG. 3 shows magnetic flux lines in the motor with an electromagnetic brake in the first embodiment shown in FIG. 1, in which a magnetic shield member is arranged, and an inner circumferential surface of a bearing stopper member is disposed in proximity to a shaft.
Figure 4:
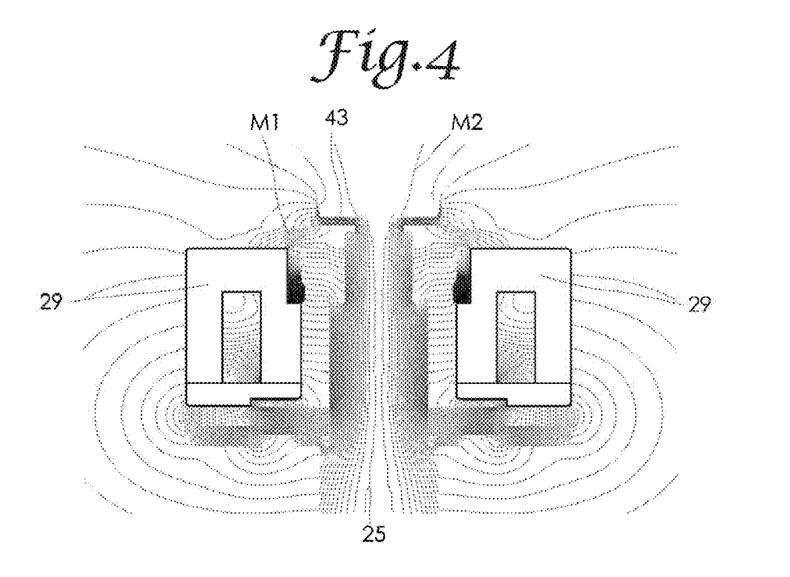
FIG. 4 shows magnetic flux lines in a motor with an electromagnetic brake in a second embodiment, in which a magnetic shield member is arranged, but an inner circumferential surface of a bearing stopper member is not disposed in proximity to a shaft.
Figure 5:
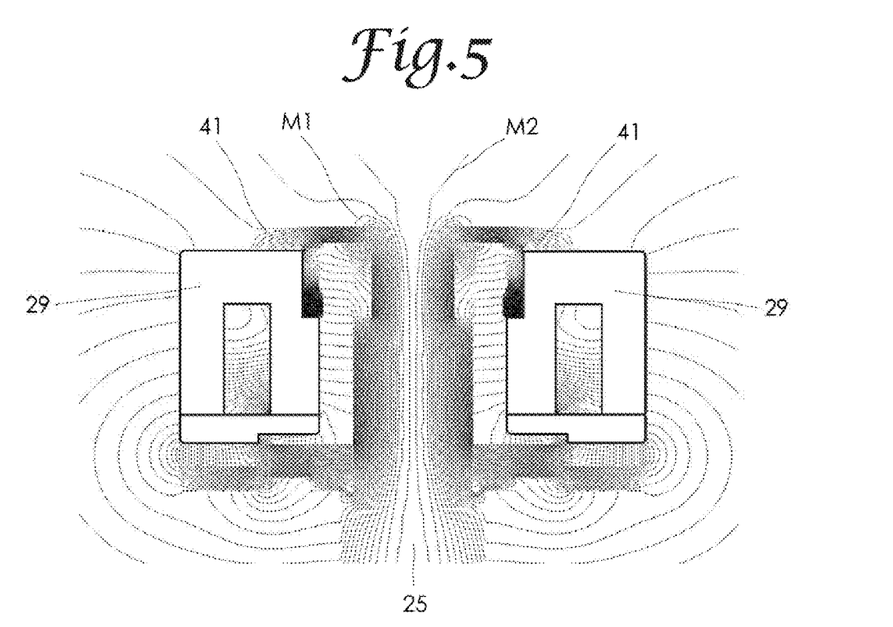
FIG. 5 shows magnetic flux lines in a motor with an electromagnetic brake in a third embodiment, in which a magnetic shield member is not arranged, but an inner circumferential surface of a bearing stopper member is disposed in proximity to a shaft.
Figure 6:
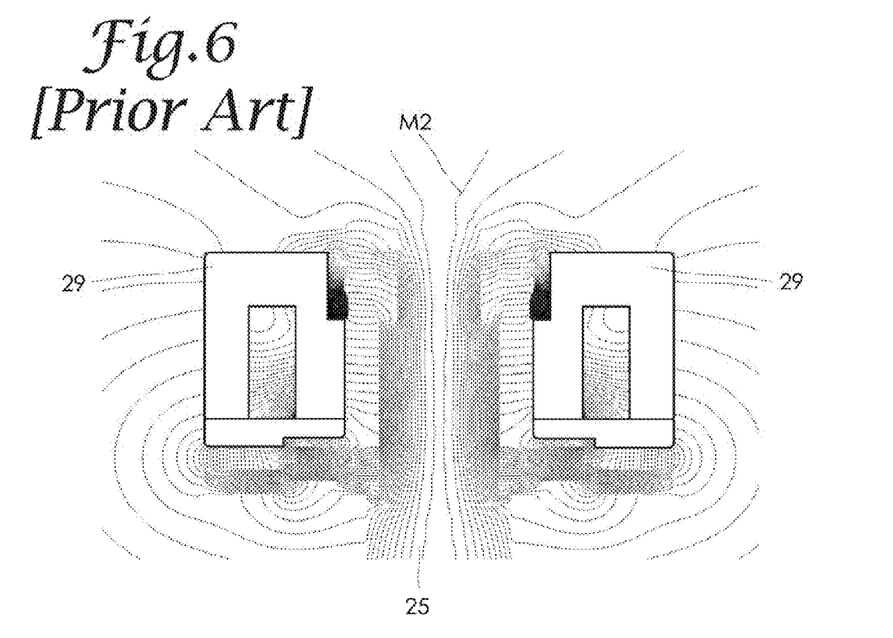
FIG. 6 shows magnetic flux lines in a motor with an electromagnetic brake in a comparative example, in which a magnetic shield member is not arranged, and an inner circumferential surface of a bearing stopper member is not disposed in proximity to a shaft.

Next, results of simulations of magnetic flux lines around the brake cores of various motors when the number of turns of the magnetic coil is set to 1000 and exciting current is set to 0.5 A will be described. FIG. 3 shows magnetic flux lines in the motor with an electromagnetic brake of the first embodiment in which the magnetic shield member is arranged between the bearing stopper member and the magnetic sensor and the inner circumferential surface of the bearing stepper member is disposed in proximity to the shaft. FIG. 4 shows magnetic flux lines in a motor with an electromagnetic brake of a second embodiment in which an inner circumferential surface of a bearing stopper member is not disposed in proximity to a shaft though a magnetic shield member is arranged between the bearing stopper member and a magnetic sensor. FIG. 5 shows magnetic flux lines in a motor with an electromagnetic brake of a third embodiment in which a magnetic shield member is not arranged between a bearing stopper member and a magnetic sensor, but an inner circumferential surface of the bearing stopper member is disposed in proximity to a shaft. FIG. 6 shows magnetic flux lines in a motor with an electromagnetic brake of a comparative example in which no magnetic shield member is arranged, and an inner circumferential surface of a bearing stopper member is not disposed in proximity to a shaft. In each of FIGS. 3 to 6, a rotation body of the magnetic sensor is omitted. It can be seen that, in the motor with an electromagnetic brake in each of the first to third embodiments shown in FIGS. 3 to 5, leakage magnetic flux M1 that has leaked through the shaft 25 flows to the brake core 29 through a portion of the magnetic shield member 43 or the bearing stopper member 41 located in proximity to the shaft 25. It follows from this that the motor with an electromagnetic brake in each of the first to third embodiments shown in FIGS. 3 to 5 may reduce the density of magnetic flux M2 that has leaked to the magnetic sensor from the end of the non-load-side end portion of the shaft 25 more than the motor with an electromagnetic brake in the comparative example, shown in FIG. 6.

Figure 7:
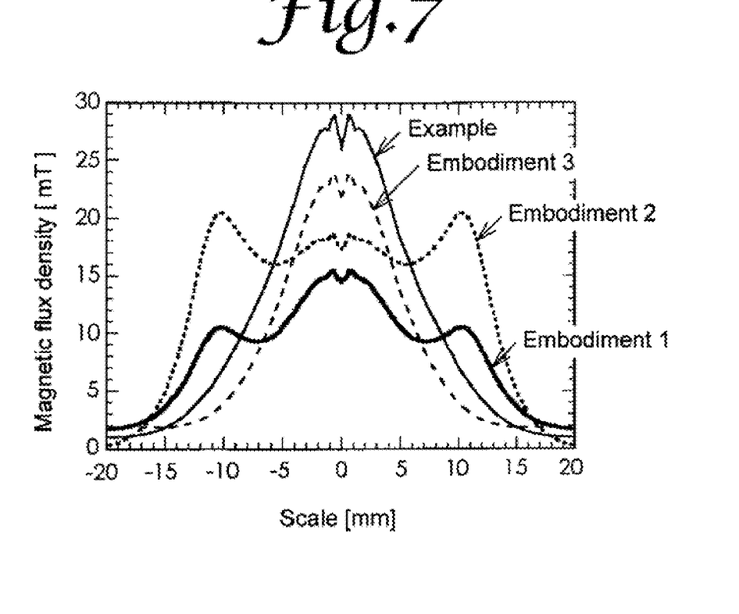
FIG. 7 shows graphs each showing a magnetic flux density distribution of a virtual plane that extends in a radial direction of the shaft from a position outwardly apart from an end of a non-load-side end portion of the shaft by a distance of 3 mm, in the motor with an electromagnetic brake in each of the first to third embodiments and the comparative example.

Next, results of examining distributions of magnetic flux densities of virtual planes in the motors in the first to third embodiments and the comparative example will be described. Each of the virtual planes extends in the radial direction of the shaft from a position outwardly apart from the end of the non-load-side end portion by a distance of 3 mm. FIG. 7 shows results of measurement of the magnetic flux densities. It can be seen from FIG. 7 that the motor in the comparative example has the highest magnetic flux density of leakage magnetic flux of the non-load-side end portion of the shaft, and the maximum value of the magnetic flux density is 29 mT. In contrast therewith, it can be seen, in the motor in the third embodiment in which no magnetic shield member is arranged and the inner circumferential surface of the bearing stopper member is disposed in proximity to the shaft, the maximum value of the magnetic flux density is 24 mT. The maximum value of the magnetic flux density in the motor of the third embodiment is approximately 17% lower than in the motor of the comparative example. It can be seen that in the motor of the second embodiment in which the inner circumferential surface of the bearing stopper member is not disposed in proximity to the motor though the magnetic shield member is arranged, the maximum value of the magnetic flux density in the vicinity of the center of a radius coordinate is 18.6 mT. The maximum value of the magnetic flux density in the vicinity of the center of the radius coordinate in the motor in the second embodiment is approximately 36% lower than in the motor of the comparative example. The magnetic flux density of the motor of the second embodiment becomes maximum in the vicinity of 10 mm in the radius coordinate. In this position, the magnetic sensor is affected by the leakage magnetic flux. In the motor of the first embodiment in which the magnetic shield member is arranged and the inner circumferential surface of the bearing stopper member is disposed in proximity to the shaft, the maximum value of the magnetic flux density in the vicinity of the center of the radius coordinate is 15.5 mT. It can be seen that the maximum value of the magnetic flux density in the motor of the first embodiment may be substantially halved from that in the motor in the comparative example.

Figure 8:
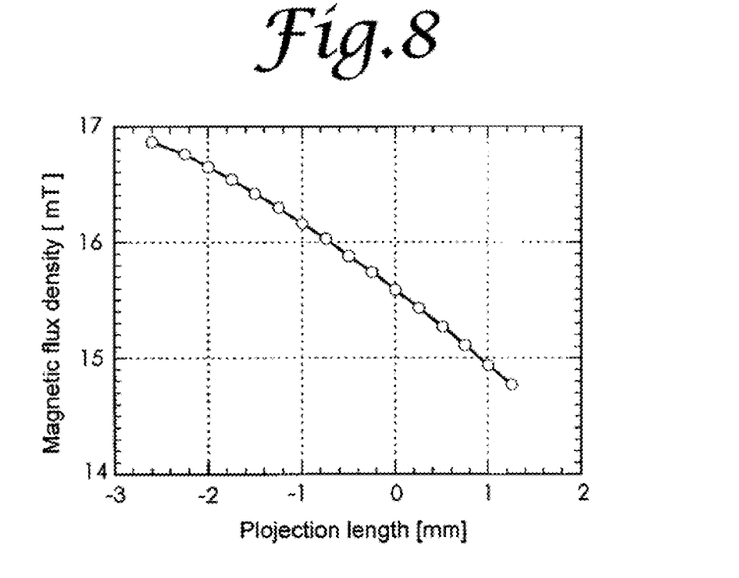
FIG. 8 is a graph showing the relationship between a length (projection length) of a projecting portion of the magnetic shield member in an axial direction of the shaft and a magnetic flux density at a location outwardly apart from the end of the non-load-side end portion of the shaft of the motor by a distance of 3 mm.

Next, results of examining the relationship between a (projection) length of the projecting portion 43b of the magnetic shield member 43 in the axial direction of the shaft 25 and a magnetic flux density in the motor of the first embodiment will be described. In order to examine the relationship between the projection length and the magnetic flux density, the projection length is variously changed, and the magnetic flux density at a location outwardly apart from the end of the non-load-side end portion of the motor shaft by a distance of 3 mm was measured. FIG. 8 shows results of measurement of the magnetic flux densities and the projection lengths. It can be seen from FIG. 8 that the more the projection length is increased, the more the magnetic flux density may be reduced.

Figure 9:
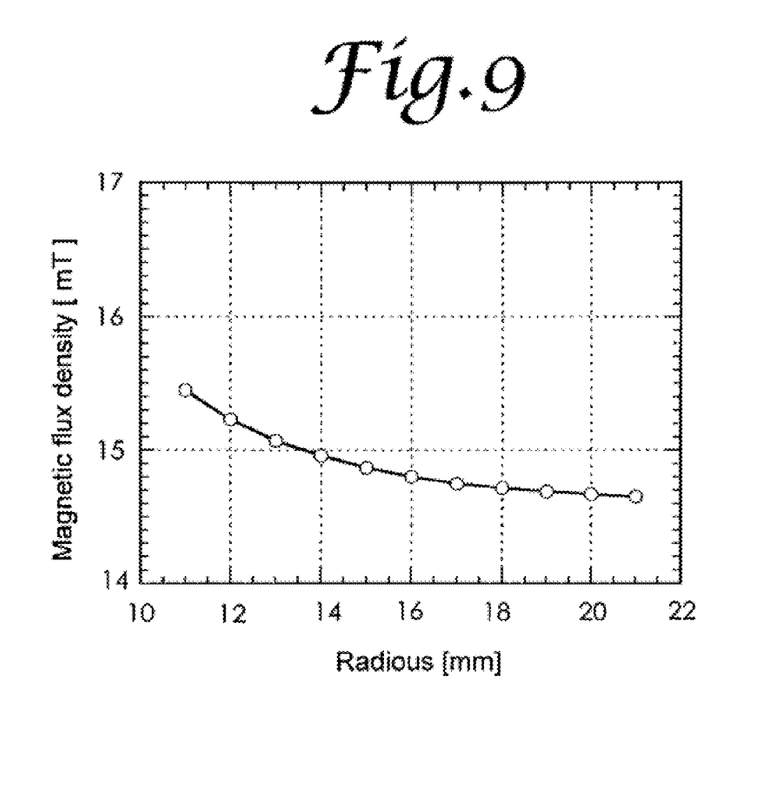
FIG. 9 is a graph showing the relationship between a radius of an outer diameter portion in a plate-like portion of the magnetic shield member and a magnetic flux density at the location outwardly apart from the end of the non-load-side end portion of the shaft of the motor by a distance of 3 mm.

Next, results of examining the relationship between a radius of the outer diameter portion in the plate-like portion 43a of the magnetic shield member 43 and a magnetic flux density in the motor of the first embodiment will be described. In order to examine the relationship between the radius of the outer diameter portion and the magnetic flux density, the radius is variously changed, and the magnetic flux density at the location outwardly apart from the end of the non-load-side end portion of the shaft by a distance of 3 mm will be described. FIG. 9 shows results of measurement of the magnetic flux densities and the radiuses. It can be seen from FIG. 9 that the more the radius of the outer diameter portion is increased, the more the magnetic flux density may be reduced. However, it can be seen that the curve indicating the relationship between the radius of the outer diameter portion and the magnetic density is saturated approximately when the radius of the outer diameter portion exceeds 18 mm, and that the effect of reducing the magnetic flux is lower than that in the above-mentioned case where the projection length is changed.

Figure 10:
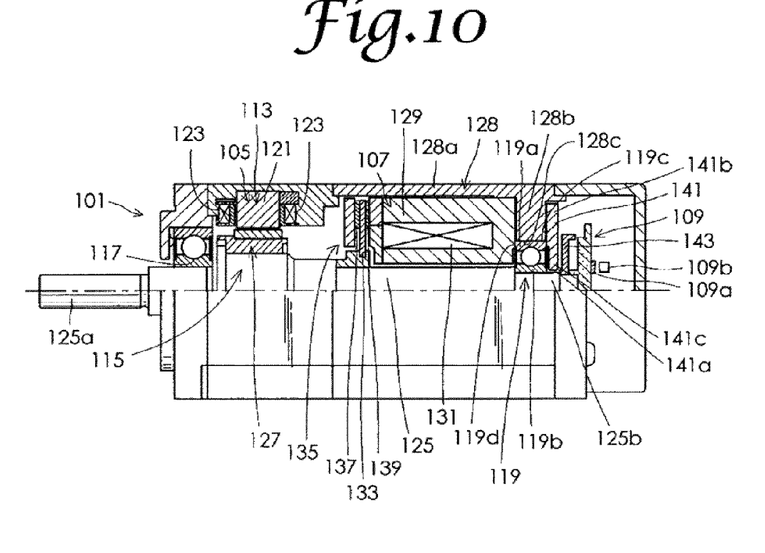
FIG. 10 is a diagram showing a cutaway half-portion of a motor with an electromagnetic brake in another embodiment of the present invention.

FIG. 10 shows a cutaway half-portion of a motor with an electromagnetic brake in another embodiment of the present invention. In the motor with an electromagnetic brake in this embodiment, a second bearing holder comprises a bracket (electromagnetic brake bracket 128) to which a brake core is fixed. The motor in this embodiment has a structure that is basically similar to that of the motor shown in FIGS. 1 and 2 except the brake core and the electromagnetic brake bracket. For this reason, by assigning reference numerals obtained by adding 100 to the respective reference numerals in FIGS. 1 and 2 to members except the brake core and the electromagnetic brake bracket, descriptions of the members will be omitted. The electromagnetic brake bracket 128 of the motor in this embodiment is formed of aluminum, which is a nonmagnetic material, and includes a cylindrical portion 128a and an annular portion 128b that extends radially inwardly from the cylindrical portion 128a. A bearing fitting portion 128c is formed of an inner circumferential surface of the annular portion 128b located radially inside of the annular portion 128b. An outer circumferential surface 119c of an outer ring 119a of a second ball bearing 119 is fitted into the bearing fitting portion 128c. The second ball bearing 119 is formed of a ferromagnetic material. In the second ball bearing, the outer ring may be ferromagnetic and the other portions (constituted from an inner ring and a ball) may be formed of a nonmagnetic material. The brake core 129 is in contact with an annular end surface 119d of the outer ring 119a of the second ball bearing 119. In this embodiment as well, a magnetic shield member 143 formed of a ferromagnetic material is arranged between a bearing stopper member 141 and a magnetic sensor 109, and an inner circumferential surface 141d of the bearing stopper member 141 formed of a ferromagnetic material is disposed in proximity to a shaft 125. As a result, in the motor with an electromagnetic brake in this embodiment, much of leakage magnetic flux flows in the order of the brake core 129, shaft 125, magnetic shield member 143, bearing stopper member 141, outer ring 119a of the second ball bearing 119, and brake core 129. The motor with an electromagnetic brake in this embodiment eliminates the need for forming a concave portion for mounting the second ball bearing in the brake core. Accordingly, manufacture of the motor is facilitated. Further, the size of a motor axis in a radial direction of the shaft may be reduced.

In this embodiment, the magnetic shield member 143 is arranged, and the inner circumferential surface of the bearing stopper member 141 is disposed in proximity to an outer circumferential surface of the shaft 125. The motor in this embodiment may adopt either one of a configuration in which the magnetic shield member is arranged and a configuration in which the inner circumferential surface of the bearing stopper member is disposed in the vicinity to the shaft.

While the preferred embodiments of the invention have been described with a certain degree of particularity with reference to the drawings, obvious modifications and variations are possible in light of the above teachings. It is therefore to be understood that within the scope of the appended claims, the invention may be practiced other than as specifically described.

What is claimed is:

1. A motor with an electromagnetic brake comprising:
   a motor stator;
   a motor rotor including a shaft and a rotor portion fixed to the shaft, the shaft being formed of a ferromagnetic material and having a load-side end portion and a non-load-side end portion;
   a first bearing that rotatably supports the shaft at a position in the vicinity of the load-side end portion; a first bearing holder that is fixed to the motor stator and holds the first bearing;
   a second bearing that rotatably supports the shaft at a position in the vicinity of the non-load-side end portion;
   a second bearing holder that is ferromagnetic and includes a bearing fitting portion into which the second bearing is fitted;
   a bearing stopper member that is ferromagnetic and is fixed to the second bearing holder to prevent the second bearing fitted into the second bearing holder from getting out of the bearing fitting portion;
   an electromagnetic brake including:
      a brake friction plate fixed to a portion of the shaft that is located between the rotor portion and the second bearing;
      a brake plate; and
      an electromagnetic coil disposed on a brake core,
   the electromagnetic brake bringing the brake plate into contact with the brake friction plate, thereby preventing the shaft from rotating when braking is applied, and keeping the brake plate and the brake friction plate apart from each other by means of an electromagnetic force generated by the electromagnetic coil, thereby allowing the shaft to rotate when braking is not applied; and
   a magnetic sensor disposed outside an end of the non-load-side end portion of the shaft projecting from the second bearing; wherein
   the bearing stopper member is of an annular structure having a through-hole through which the shaft passes, and has an inner circumferential surface that faces an outer circumferential surface of the shaft and is located in proximity to the outer circumferential surface of the shaft.

2. The motor with an electromagnetic brake according to claim 1, further comprising a magnetic shield member that is fixed to the non-load-side end portion of the shaft, and located between the bearing stopper member and the magnetic sensor to guide leakage magnetic flux, which has been generated by the electromagnetic coil and leaked through the shaft, from the shaft to the bearing stopper member, thereby reducing influence of the leakage magnetic flux on the magnetic sensor.

3. The motor with an electromagnetic brake according to claim 2, wherein
   the magnetic shield member comprises:
      a plate-like portion that extends in a radial direction of the shaft and faces the bearing stopper member with a space interposed therebetween in an axial direction of the shaft; and
      a projecting portion that projects from the plate-like portion toward the magnetic sensor.

4. The motor with an electromagnetic brake according to claim 3, wherein
   the projecting portion is integrally formed with the plate-like portion of a disc shape and is of a cylindrical shape that projects toward the magnetic sensor from an outer circumferential portion of the plate-like portion.

5. The motor with an electromagnetic brake according to claim 4, wherein
   the magnetic sensor is a magnetic rotary encoder comprising:
      a rotation body fixed to the end of the shaft;
      a plurality of permanent magnets disposed at the rotation body; and
      a magnetic detector that detects magnetic fluxes of the permanent magnets; and
   an end of the cylindrical projecting portion of the magnetic shield member faces the rotation body with a space interposed therebetween.

6. The motor with an electromagnetic brake according to claim 2, wherein the second bearing holder is the brake core.

7. The motor with an electromagnetic brake according to claim 2, wherein the first and second bearing each comprise a ball bearing.

8. The motor with an electromagnetic brake according to claim 1, wherein the second bearing holder is the brake core.

9. The motor with an electromagnetic brake according to claim 1, wherein the first and second bearing each comprise a ball bearing.

10. The motor with an electromagnetic brake according to claim 1, wherein
    the bearing stopper member is arranged to be in contact with an outer ring of the second bearing, but not to be in contact with an inner ring of the second bearing.

11. A motor with an electromagnetic brake comprising:
    a motor stator;
    a motor rotor including a shaft and a rotor portion fixed to the shaft, the shaft being formed of a ferromagnetic material and having a load-side end portion and a non-load-side end portion;
    a first bearing that rotatably supports the shaft at a position in the vicinity of the load-side end portion; a first bearing holder that is fixed to the motor stator and holds the first bearing;
    a second bearing that rotatably supports the shaft at a position in the vicinity of the non-load-side end portion;
    a second bearing holder that is ferromagnetic and includes a bearing fitting portion into which the second bearing is fitted;
    a bearing stopper member that is ferromagnetic and is fixed to the second bearing holder to prevent the second bearing fitted into the second bearing holder from getting out of the bearing fitting portion;

an electromagnetic brake including:
  a brake friction plate fixed to a portion of the shaft that is located between the rotor portion and the second bearing;
  a brake plate; and
  an electromagnetic coil disposed on a brake core,
the electromagnetic brake bringing the brake plate into contact with the brake friction plate, thereby preventing the shaft from rotating when braking is applied, and keeping the brake plate and the brake friction plate apart from each other by means of an electromagnetic force generated by the electromagnetic coil, thereby allowing the shaft to rotate when braking is not applied;
a magnetic sensor disposed outside an end of the non-load-side end portion of the shaft projecting from the second bearing; and
a magnetic shield member that is fixed to the non-load-side end portion of the shaft, and located between the bearing stopper member and the magnetic sensor to guide leakage magnetic flux, which has been generated by the electromagnetic coil and leaked through the shaft, from the shaft to the bearing stopper member, thereby reducing influence of the leakage magnetic flux on the magnetic sensor.

12. A motor with an electromagnetic brake comprising:
a motor stator;
a motor rotor including a shaft and a rotor portion fixed to the shaft, the shaft being formed of a ferromagnetic material and having a load-side end portion and a non-load-side end portion;
a first bearing comprising a ball bearing that rotatably supports the shaft at a position in the vicinity of the load-side end portion;
a first bearing holder that is fixed to the motor stator and holds the first bearing;
a second bearing that rotatably supports the shaft at a position in the vicinity of the non-load-side end portion, and includes an outer ring which is ferromagnetic;
a second bearing holder comprising a nonmagnetic bracket to which a brake core is fixed and including a bearing fitting portion into which the second bearing is fitted;
a bearing stopper member that is ferromagnetic and is fixed to the second bearing holder in order to prevent the second bearing fitted into the second bearing holder from getting out of the bearing fitting portion;
an electromagnetic brake including:
  a brake friction plate fixed to a portion of the shaft that is located between the rotor portion and the second bearing;
  a brake plate; and
  an electromagnetic coil disposed on the brake core, the electromagnetic brake bringing the brake plate into contact with the brake friction plate, thereby preventing the shaft from rotating when braking is applied, and keeping the brake plate and the brake friction plate apart from each other by means of an electromagnetic force generated by the electromagnetic coil, thereby allowing the shaft to rotate when braking is not applied; and
a magnetic sensor disposed outside an end of the non-load-side end portion of the shaft projecting from the second bearing; wherein
the outer ring of the second bearing is in contact with the brake core; and
the bearing stopper member is of an annular structure having a through-hole through which the shaft passes, and has an inner circumferential surface that faces an outer circumferential surface of the shaft and is located in proximity to the outer circumferential surface of the shaft.

13. The motor with an electromagnetic brake according to claim 12, further comprising a magnetic shield member that is fixed to the non-load-side end portion of the shaft, and located between the bearing stopper member and the magnetic sensor to guide leakage magnetic flux that has been generated by the electromagnetic coil and leaked through the shaft, from the shaft to the bearing stopper member, thereby reducing influence of the leakage the magnetic flux on the magnetic sensor.

14. The motor with an electromagnetic brake according to claim 12, wherein
the magnetic shield member comprises:
  a plate-like portion that extends in a radial direction of the shaft and faces the bearing stopper member with a space interposed therebetween in an axial direction of the shaft; and
  a projecting portion that projects from the plate-like portion toward the magnetic sensor.

15. The motor with an electromagnetic brake according to claim 14, wherein
the projecting portion is integrally formed with the plate-like portion of a disc shape and is of a cylindrical shape that projects toward the magnetic sensor from an outer circumferential portion of the plate-like portion.

16. The motor with an electromagnetic brake according to claim 15, wherein
the magnetic sensor is a magnetic rotary encoder comprising:
  a rotation body fixed to the end of the shaft;
  a plurality of permanent magnets disposed at the rotation body; and
  a magnetic detector that detects magnetic fluxes of the permanent magnets; and
an end of the cylindrical projecting portion of the magnetic shield member faces the rotation body with a space interposed therebetween.

17. The motor with an electromagnetic brake according to claim 12, wherein
the bearing stopper member is arranged to be in contact with an outer ring of the second bearing, but not to be in contact with an inner ring of the second bearing.

18. A motor with an electromagnetic brake comprising:
a motor stator;
a motor rotor including a shaft and a rotor portion fixed to the shaft, the shaft being formed of a ferromagnetic material and having a load-side end portion and a non-load-side end portion;
a first bearing comprising a ball bearing that rotatably supports the shaft at a position in the vicinity of the load-side end portion;
a first bearing holder that is fixed to the motor stator and holds the first bearing;
a second bearing that rotatably supports the shaft at a position in the vicinity of the non-load-side end portion, and includes an outer ring which is ferromagnetic;
a second bearing holder comprising a nonmagnetic bracket to which a brake core is fixed and including a bearing fitting portion into which the second bearing is fitted;
a bearing stopper member that is ferromagnetic and is fixed to the second bearing holder in order to prevent the second bearing fitted into the second bearing holder from getting out of the bearing fitting portion;

an electromagnetic brake including:
- a brake friction plate fixed to a portion of the shaft that is located between the rotor portion and the second bearing;
- a brake plate; and
- an electromagnetic coil disposed on the brake core, the electromagnetic brake bringing the brake plate into contact with the brake friction plate, thereby preventing the shaft from rotating when braking is applied, and keeping the brake plate and the brake friction plate apart from each other by means of an electromagnetic force generated by the electromagnetic coil, thereby allowing the shaft to rotate when braking is not applied; and
- a magnetic sensor disposed outside an end of the non-load-side end portion of the shaft projecting from the second bearing; wherein the outer ring of the second bearing is in contact with the brake core; and a magnetic shield member is fixed to the non-load-side end portion of the shaft, and located between the bearing stopper member and the magnetic sensor to guide leakage magnetic flux that has been generated by the electromagnetic coil and leaked through the shaft, from the shaft to the bearing stopper member, thereby reducing influence of the leakage the magnetic flux on the magnetic sensor.

* * * * *